US011937675B1

(12) United States Patent
Khandelwal

(10) Patent No.: US 11,937,675 B1
(45) Date of Patent: Mar. 26, 2024

(54) HOLDING DEVICE FOR ONE OR MORE HIGHLIGHTER PENS

(71) Applicant: Sangharsh Khandelwal, Warsaw (PL)

(72) Inventor: Sangharsh Khandelwal, Warsaw (PL)

( * ) Notice: Subject to any disclaimer, the term of this patent is extended or adjusted under 35 U.S.C. 154(b) by 153 days.

(21) Appl. No.: 17/586,852

(22) Filed: Jan. 28, 2022

Related U.S. Application Data

(60) Provisional application No. 63/142,579, filed on Jan. 25, 2021.

(51) Int. Cl.
*A45C 11/34* (2006.01)
*B43K 23/12* (2006.01)
*B43K 29/00* (2006.01)
*B42D 9/00* (2006.01)

(52) U.S. Cl.
CPC .............. *A45C 11/34* (2013.01); *B43K 23/12* (2013.01); *B43K 29/00* (2013.01); *B42D 9/002* (2013.01)

(58) Field of Classification Search
CPC ......... A45C 11/34; B43K 23/12; B43K 29/00
See application file for complete search history.

(56) References Cited

U.S. PATENT DOCUMENTS 1,620,529 A * 3/1927 Ferris ................... B43M 99/003 211/69.5
1,641,829 A * 9/1927 Sheaffer ............... B43M 99/006 211/69.5
1,641,846 A * 9/1927 Fremon ................ B43M 99/006 211/69.5
1,762,104 A * 6/1930 Liddell ................ B43M 99/003 211/69.5
1,804,120 A * 5/1931 Sengbusch ........... B43M 99/003 211/69.5
2,011,040 A * 8/1935 Cuthbert .............. B43M 99/003 211/69.7
3,176,662 A * 4/1965 Williams ............. B43M 99/001 211/69.5
3,428,380 A * 2/1969 Danjczek ............. B43M 99/007 211/69.5
3,463,323 A * 8/1969 Riepe ................... B43M 99/007 D19/135
(Continued)

FOREIGN PATENT DOCUMENTS

DE 1951217 A1 * 4/1971
DE 2453740 A1 * 5/1976
(Continued)

*Primary Examiner* — Stanton L Krycinski
(74) *Attorney, Agent, or Firm* — Michael D. Eisenberg

(57) ABSTRACT

A holding device for a highlighter pen, comprising a holding case and a base. The holding case includes: a channel configured to receive the highlighter pen and having a first opening and a second; a gripping unit in the channel, configured to removably grip the highlighter pen; a chamber extending from the second end of the channel and configured to receive a tip of the highlighter pen, the chamber comprising a sealing unit configured to cooperate with the highlighter pen when the highlighter pen has traversed the sealing unit, to generate an airtight environment in which the tip of the highlighter pen is contained; at least one first magnet. The base has at least one second magnet, such that attraction between the at least one first magnet and the at least one second magnet makes the base removably joinable to the holding case.

20 Claims, 9 Drawing Sheets

(56) References Cited

U.S. PATENT DOCUMENTS

| | | | | | |
|---|---|---|---|---|---|
| 3,866,992 | A * | 2/1975 | Katz | B43M 99/007 | 211/69.5 |
| 4,334,622 | A * | 6/1982 | Mutschler | B43M 99/007 | 211/69.5 |
| 4,349,109 | A * | 9/1982 | Scordato | B01L 9/543 | 422/933 |
| 4,355,726 | A * | 10/1982 | Mutschler | B43M 99/007 | 211/69.5 |
| 4,493,575 | A * | 1/1985 | Mutschler | B43M 99/007 | 211/69.8 |
| 4,548,325 | A * | 10/1985 | Hojer | B43M 99/007 | 401/254 |
| 4,573,818 | A * | 3/1986 | Kodera | B43K 25/022 | 401/35 |
| 4,669,617 | A * | 6/1987 | Boeckmann | A45C 11/34 | 211/69.7 |
| 4,798,310 | A * | 1/1989 | Kasai | B43K 23/001 | 221/87 |
| 4,826,338 | A * | 5/1989 | Kilpatrick | B43K 8/003 | 401/35 |
| 5,033,629 | A * | 7/1991 | Caine | B43M 99/007 | 211/69.5 |
| 5,163,549 | A * | 11/1992 | Hayduchok | A45C 11/34 | 206/214 |
| 5,263,593 | A * | 11/1993 | Aida | A45C 11/34 | 211/69.7 |
| 6,022,159 | A * | 2/2000 | Kossnar | B43M 99/006 | 401/35 |
| 6,186,461 | B1 * | 2/2001 | Pelaez | B43K 23/002 | 206/214 |
| 6,202,862 | B1 * | 3/2001 | Acquaviva | B43K 21/003 | 211/69.5 |
| 6,257,539 | B1 * | 7/2001 | Pelaez | B43K 23/002 | 206/214 |
| 6,871,767 | B2 * | 3/2005 | Perlman | B43K 23/04 | 206/214 |
| 7,419,320 | B2 * | 9/2008 | LaBrasca | A45C 11/34 | 206/214 |
| 7,740,133 | B2 * | 6/2010 | Lamas | A45C 11/36 | 206/214 |
| 7,819,600 | B2 * | 10/2010 | LaBrasca | B43K 23/001 | 206/214 |
| 9,198,491 | B2 * | 12/2015 | Chang | A45F 5/10 | |
| 9,980,547 | B2 * | 5/2018 | Brown, Jr. | A45C 11/34 | |
| 10,638,822 | B2 * | 5/2020 | Fagu | B43M 99/006 | |
| 10,787,023 | B2 * | 9/2020 | Brand | B43K 29/00 | |
| 2005/0126935 | A1 * | 6/2005 | Reichmann | A45C 11/34 | 206/214 |
| 2006/0282989 | A1 * | 12/2006 | Dietz | B43K 25/02 | 24/10 R |
| 2006/0282993 | A1 * | 12/2006 | Dietz | B43K 23/001 | 24/303 |
| 2009/0026210 | A1 * | 1/2009 | Chan | B25H 3/003 | 220/529 |
| 2014/0270899 | A1 * | 9/2014 | Davies-Smith | B43K 25/022 | 401/195 |
| 2016/0023500 | A1 * | 1/2016 | Wang | B43K 23/12 | 401/131 |
| 2016/0286922 | A1 * | 10/2016 | Chorney | B43M 99/008 | |
| 2017/0043611 | A1 * | 2/2017 | Van Der Zande | B43K 23/06 | |
| 2022/0258525 | A1 * | 8/2022 | Callahan | A45C 11/34 | |

FOREIGN PATENT DOCUMENTS

| | | | | |
|---|---|---|---|---|
| EP | 2711310 | A1 * | 3/2014 | A45C 11/34 |
| FR | 2489753 | A1 * | 3/1982 | |
| KR | 200415850 | Y1 * | 5/2006 | |
| KR | 20120084349 | A * | 7/2012 | |
| WO | WO-2017181957 | A1 * | 10/2017 | |

* cited by examiner

HOLDING DEVICE FOR ONE OR MORE HIGHLIGHTER PENS

CROSS-REFERENCES TO RELATED APPLICATIONS

The present application claims priority from U.S. Provisional Application Ser. No. 63/142,579 filed on Jan. 28, 2021, which is hereby incorporated herein by reference in their entirety.

TECHNICAL FIELD

The present application, in some embodiments thereof, relates to stationery products, and more specifically to writing implements (such as markers or highlighters, for example) and cases for holding the writing implements.

BACKGROUND

Reading books such as novels, educational textbooks, personal development books, and other genres have existed since forever. Even after the new era of e-book readers, there have not been significant shifts in the demand for physical books.

Highlighters or marker pens have been used to mark the text to enhance learning and understanding effects. Different colors are used to signify certain characteristics of the text, (for example, important reads, quotes, check text later, etc.). Sticky flags are stuck to pages on of a book or notebook and extend away from the page, so that the sticky flags can be easily seen even when the book or notebook is closed. The sticky flags are used as a permanent bookmarks to indicate desired sections of the book or notebook and enable a user to easily find those sections.

It is common for users to use at least a pair of highlighters to highlight different characteristics of the text in different colors. Thus, users need to have some external case (pouch, marker case, bag, etc.) to carry their highlighters. Using highlighters may be unconfutable during commutes or away from home-like environment. Also, due to the nature of their ink, highlighters need caps to prevent the ink from drying and from coloring other object in the case the highlighters are held. Carrying and using sing sticky flags together with highlighters may be messy and uncomfortable, especially outdoors.

The culture of reading has shown a significant development of an individual as a being and a citizen of society. The culture of reading needs to be promoted since the average person in the United States of America reads less than 12 books per year.

BRIEF SUMMARY OF THE INVENTION

The inventor has found that existing highlighters in the market do not propose good portability and quality to the users, which leads to the users missing out on their learning experience.

Therefore, a need exists in the field for novel highlighters that temporarily attach to the user's books and allow user to travel with their learning essential (highlighters, pen, pencil, flags and marker, etc.) and do not miss out on marking important texts.

The unique use and design of the holding device of the present invention allow the user to have one or more highlighters in a single holding case which temporarily clasps to books or notebook, hence solving the problem of portability and comfort.

In some embodiments of the present invention, a highlighter holding device is provided, which acts as a single case installed with a cap-like internal arrangement for highlighters to be airtight and anti-swallow. The holding device is configured to attach to books or notebooks via magnets as will be explained below. In some embodiments of the present invention, a kit is provided including the holding device and on or more highlighters. The highlighters are specially designed for the case and are configure for being removably lockable with the holding device. In this manner, when the user places a highlighter in the holding device, the holding device cooperates with the highlighter, securely joining the highlighter to the holding device and requiring a specific manipulation of the highlighter by the user to remove the highlighter from the holding device.

Therefore, an aspect of some embodiments of the present invention relates to a holding device for a highlighter pen, comprising a holding case and a base. The holding case includes: at least one channel to receive the highlighter pen, the at least one channel having a first opening at a first end of the channel and a second opening at a second end of the channel, the first opening being configured for insertion of the highlighter pen into the channel; a gripping unit in the channel, configured to removably grip the highlighter pen inside the channel; at least one chamber extending from the second end of the at least one channel and configured to receive a tip of the highlighter pen, the chamber comprising a sealing unit configured to cooperate with the highlighter pen when the highlighter pen has traversed the sealing unit, to seal an airtight environment in which the tip of the highlighter pen is contained from an external environment; at least one first magnet. The base has at least one second magnet, such that attraction between the at least one first magnet and the at least one second magnet makes the base removably joinable to the holding case.

In a variant, the gripping unit comprises first threads configured to cooperate with second threads on the highlighter pen.

In another variant, the sealing unit is positioned to cooperate with the highlighter pen when the highlighter pen is fully threaded into the first threads.

In yet another variant, the gripping unit comprises a gasket configured to grip the highlighter pen by radially constricting the highlighter pen.

In a further variant, the gripping unit comprises a third magnet configured to cooperate via attraction to a fourth magnet located on the highlighter pen when the second magnet on the highlighter pen is aligned with the magnet of the gripping unit.

In yet a further variant, the holding device includes at least one sticky note container joined to the holding case.

The at least one sticky flag container may be removably joined to the holding case.

In a variant, the at least one channel comprises a plurality of channels, and wherein the at least one chamber comprises a plurality of chambers, each of the plurality of chambers extending from a respective one of the plurality of channels.

In another variant, the at least one chamber is radially narrower than the at least one channel.

Another aspect of some embodiments of the present invention relates to a kit, comprising the holding device previously mentioned, and at least one highlighter pen.

In a variant, the gripping unit comprises first threads and the highlighter pen comprises second threads, such that the first threads are configured to cooperate with second threads.

In a variant, the sealing unit is positioned to cooperate with the highlighter pen when the highlighter pen is fully threaded into the first threads.

In another variant, the gripping unit comprises a gasket configured to grip the highlighter pen by radially constricting the highlighter pen.

In yet another variant, the gripping unit comprises a third magnet configured to cooperate via attraction to a fourth magnet located on the highlighter pen when the second magnet on the highlighter pen is aligned with the magnet of the gripping unit.

In a further variant, the kit comprises at least on sticky flag container joined to the holding case.

The at least one sticky flag container may be removably joined to the holding case.

In a variant, the at least one channel comprises a plurality of channels, and wherein the at least one chamber comprises a plurality of chambers, each of the plurality of chambers extending from a respective one of the plurality of channels.

In another variant, the at least one chamber is radially narrower than the at least one channel.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
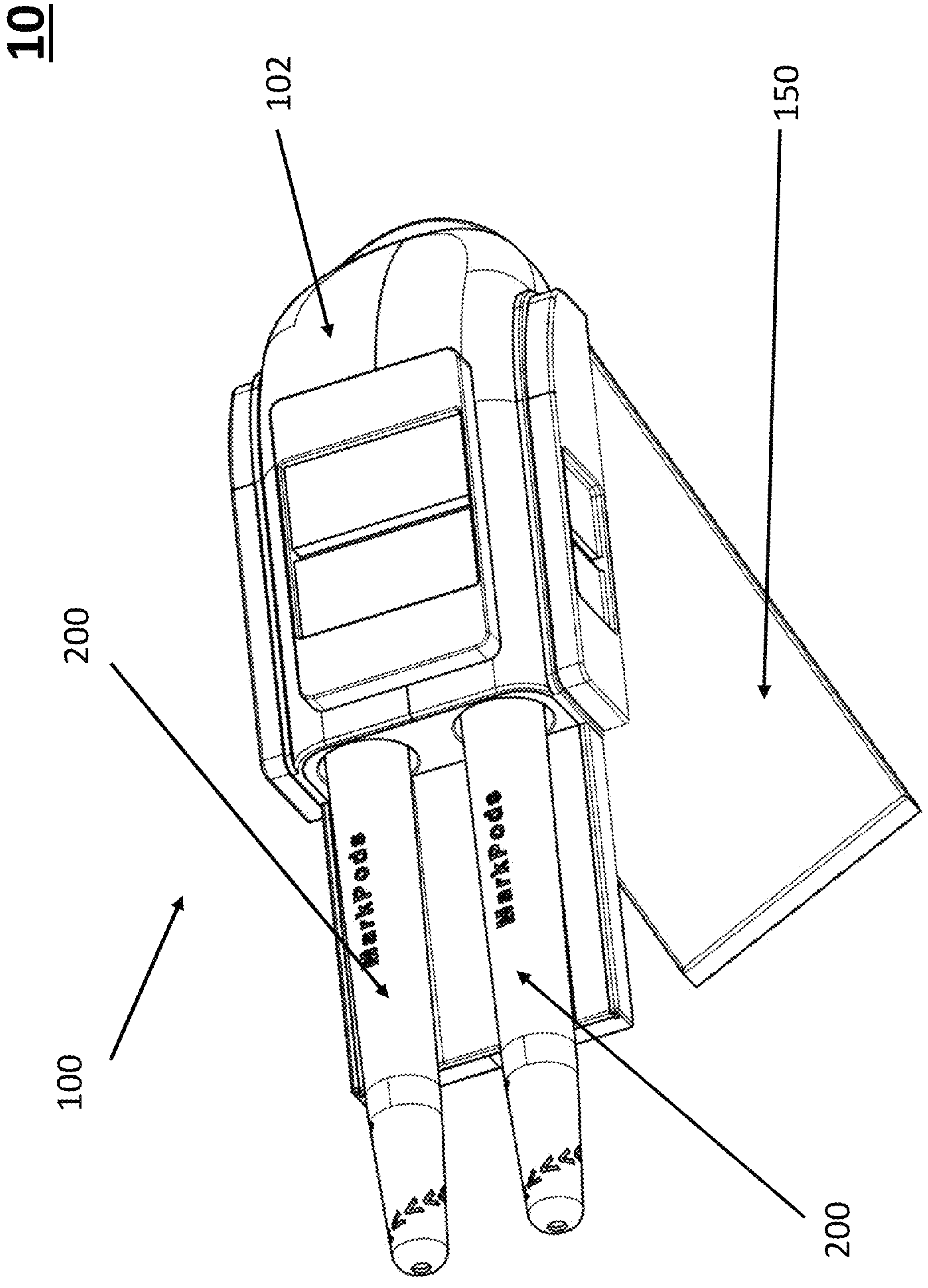
FIG. 1 illustrates a kit which includes a holding device and highlighter pens, according to some embodiments of the present invention.

Referring to the Figures, FIG. 1 illustrates a kit 10 which includes a holding device and highlighter pens, according to some embodiments of the present invention.

The kit 10 includes a holding device 100 and one or more highlighter pens 200. The holding device 100 includes a holding case 102 and a base 150.

Figure 2:
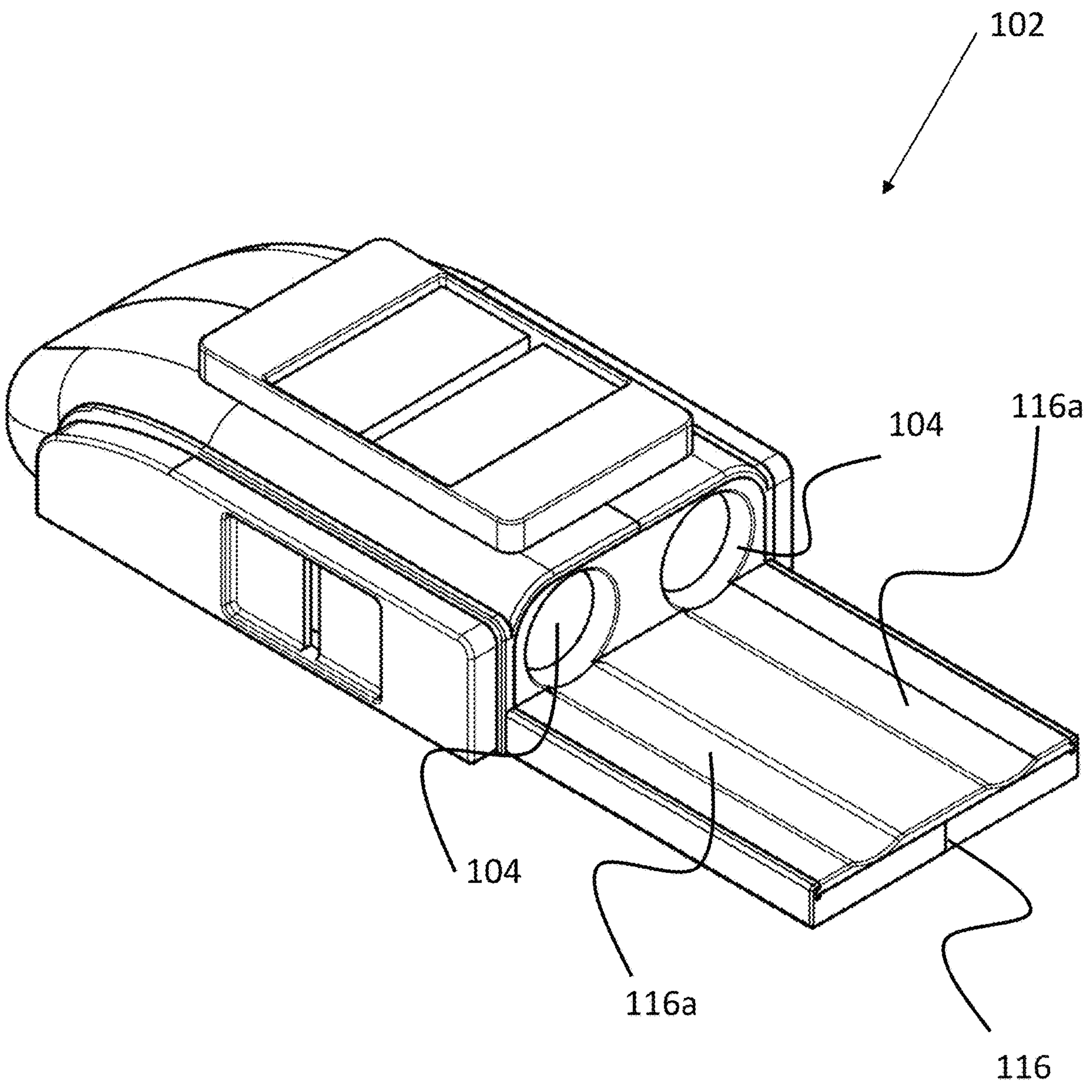
FIG. 2 is a perspective view a holding case of the holding device of FIG. 1, according to some embodiments of the present invention.
Figure 3:
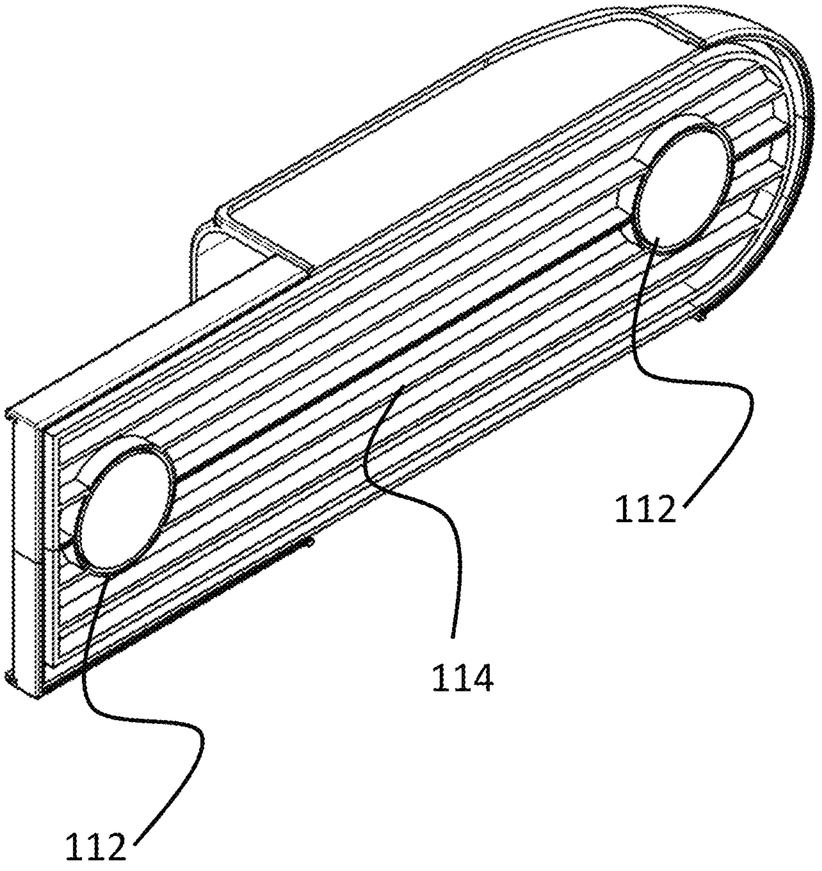
FIG. 3 shows the bottom side of the holding case, according to some embodiments of the present invention.
Figure 4:
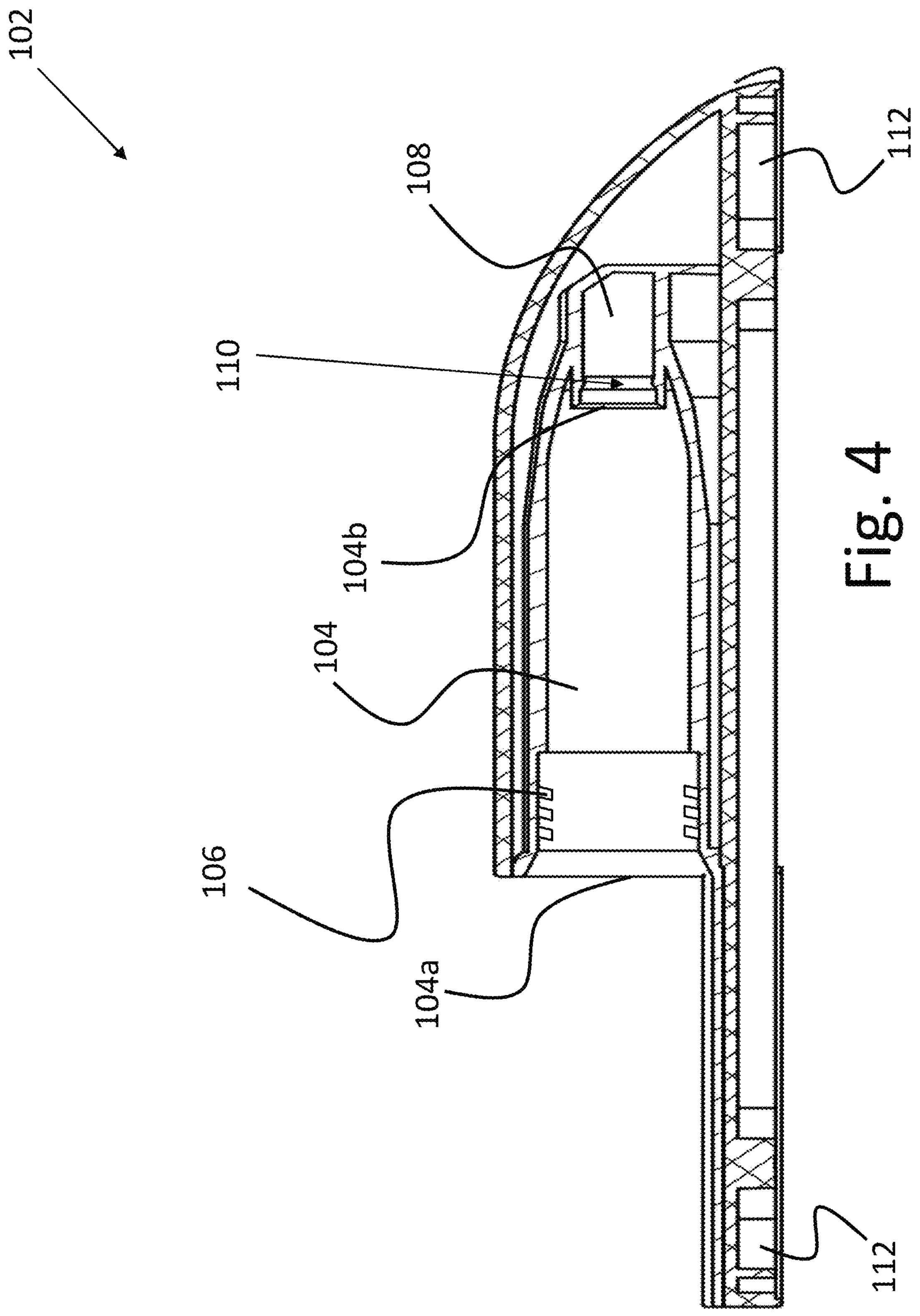
FIG. 4 is a cross-sectional side view of the holding case of FIGS. 2 and 3, according to some embodiments of the present invention.

FIG. 2 is a perspective view a holding case of the holding device of FIG. 1, according to some embodiments of the present invention. FIG. 3 illustrates the bottom side of the holding case, according to some embodiments of the present invention. FIG. 4 is a cross-sectional side view of the holding case of FIGS. 2 and 3, according to some embodiments of the present invention.

The holding case 102 includes a least one channel 104, a gripping unit 106 in each channel, at least one chamber 108, a sealing unit 110 in each chamber 108, and one or more magnet 112.

The channel 104 is configured to receive the highlighter pen. The channel 104 has a first opening 104*a* at a first end of the channel 104 and a second opening 104*b* at a second end of the channel 104. The first opening 104*a* is being configured for insertion of the highlighter pen into the channel 104.

The gripping unit 106 is configured to removably grip the highlighter pen to prevent the highlighter pen from falling off the holding case 102, while enabling the user to remove the highlighter pen from the holding case 102 with a certain manipulation of the highlighter pen. The gripping unit 106 allows the highlighter to stay secure in the holding case 102 at any angle, without requiring the user to hold the highlighter in place. The gripping unit 106 is designed to easily enable the release of the highlighter pen from the holding case 106, for example allowing the user to release of the highlighter pen from the holding case 106 with a single hand.

The chamber 108 extends from the second opening 104*b* of the channel 104 and is configured to receive the tip of the highlighter pen. The sealing unit 110 is configured to cooperate with the highlighter pen when the tip of the highlighter pen has traversed and cleared the sealing unit 110. In this manner, the sealing unit 110 creates an airtight environment in which the tip of the highlighter pen is contained, and seals with from an external environment. This airtight environment slows the drying of the ink on the tip (e.g., felt tip) of the highlighter pen and enhances the longevity of the highlighter pen. The sealing unit 100 may include, for example a rubber O-ring which constricts a portion of the highlighter pen, so that the tip inside the chamber 108 is sealed from an outside environment. In some embodiments of the present invention, the chamber is narrower than the channel, in order to decrease the amount of air in the sealed environment and further increase the longevity of the highlighter pen. In some embodiments of the present invention, the sealing unit 110 is positioned to cooperate with the highlighter pen when the highlighter pen is gripped by the gripping unit (e.g., fully threaded into the threads of the gripping unit).

The one or more magnets 112 are joined to the holding case 102, to enable the holding case 102 to be joined to the base 150, as will be explained further below. In some embodiments of the present invention, two magnets 112 are present and are located at opposing end sections of the holding case 102, as seen in FIGS. 3 and 4.

In some embodiments of the present invention the bottom of the holding case 102 may include a friction enhancing sheet 114. The friction enhancing sheet 114 is the portion of the holding case that comes into contact with the cover of a book or notebook when the holding case 102 and the base 150 are placed on opposite surfaces of the cover and clasp the cover via magnetic attraction between each other. The friction enhancing sheet 114 increases friction between the holding case 102 and the cover, to decrease a chance of the holding case slipping from the cover. The friction enhancing sheet 114 may include, for example, silicon or rubber. The friction enhancing sheet 114 may have corrugations to further increase friction between the holding case 102 and the cover of the book or notebook.

In some embodiments of the present invention, the holding case 102 includes an extension panel 116 extending outward from the first opening 104*a*. The extension panel 116 may have one or more grooves 116*a*, each leading a respective channel 104. The groove(s) 116*a* may be sized to partially receive or cradle the highlighter pen to ease the insertion of the highlighter pen into the respective channel 104.

In a variant, the gripping unit 106 includes, for example threads for cooperating with threads of a highlighter pen. In this manner, the highlighter pen can be securely joined to and removable from the holding case 102 by a screwing motion by the user. In another variant, the gripping unit 106 includes a rubber gasket inside the channel that radially constricts the highlighter pen when the highlighter pen is pushed into the channel 104 by the user. In yet another variant, the gripping unit 106 includes a magnet configured to be attracted to a magnet present in the highlighter pen when the highlighter pen is slid into the channel so that the magnet on the pan aligns with the magnet on the gripping unit 106. The user may insert the highlighter pen into or remove the highlighter pen from the channel 104 by holding the highlighter pen and exerting force in the desired direction of motion of the highlighter pen. Other gripping techniques may be used and are within the scope of the present invention.

In some embodiments of the present invention, the corners of the holding case 102 are round, to prevent damage to the user or to objects. In some embodiments of the present invention, the edges of the holding case 102 are filleted, to decrease the risk of harm to a user then the holding case 102 is clasped to the base by the attraction of the magnet(s) 112 to the magnet(s) of the base. The holding case 104 may be anti-swallow to prevent swallowing of the holding case by a person and to ensure adherence to various international safety standards.

It should be noted that in some embodiments of the present invention, the holding case 102 is configured to hold a plurality (two, three, four, or more) highlighter pens 200. In such embodiments, the holding case 102 includes a plurality of channels 104, and a plurality of chambers 108. Each of the plurality of chambers 108 extends from a respective one of the plurality of channels 104. Each channel 104 is includes a respective gripping unit 106. Each chamber 108 includes a respective sealing unit 110.

Figure 5:
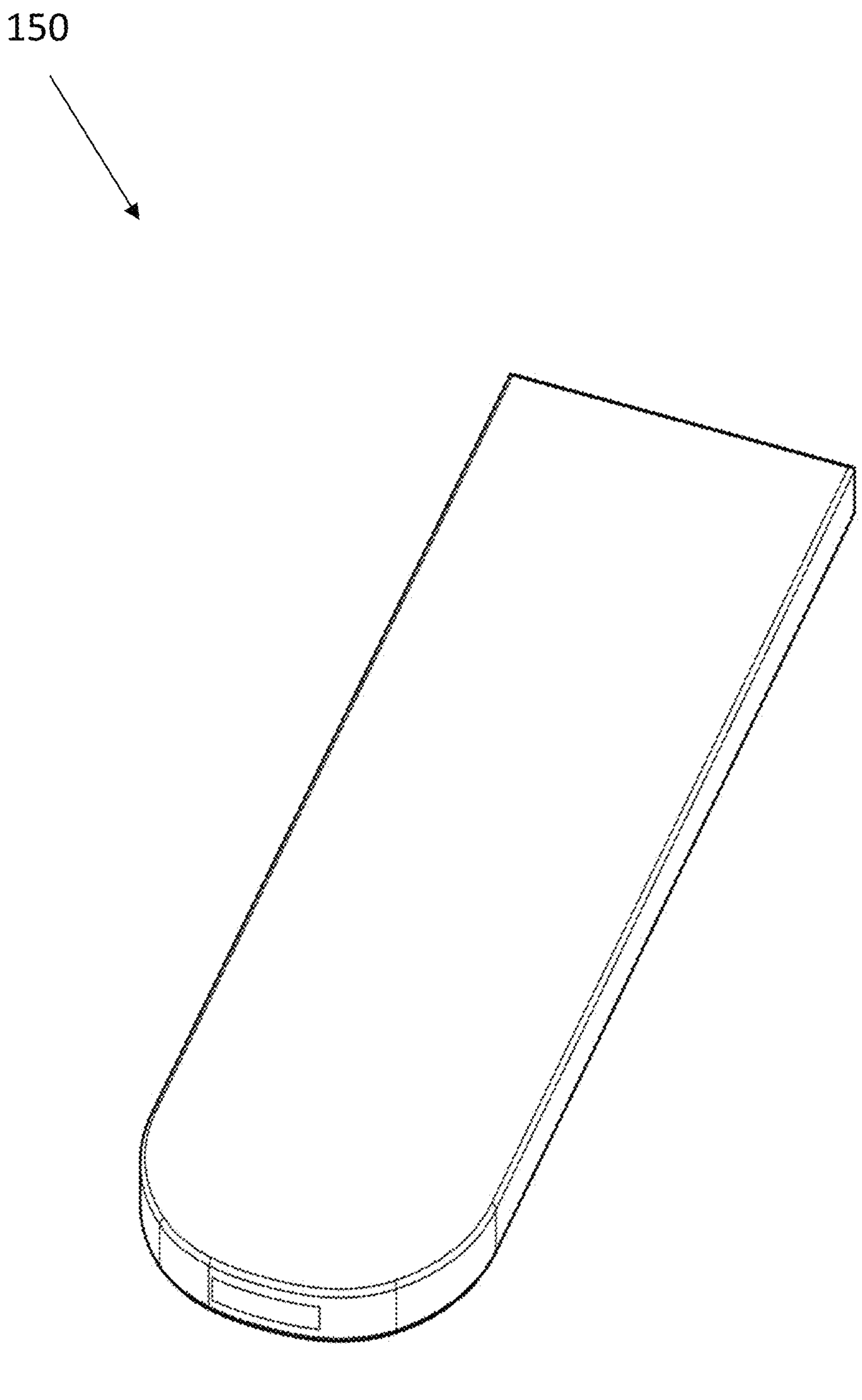
FIG. 5 is a perspective view of the base of the holding device of FIG. 1, according to some embodiments of the present invention.
Figure 6:
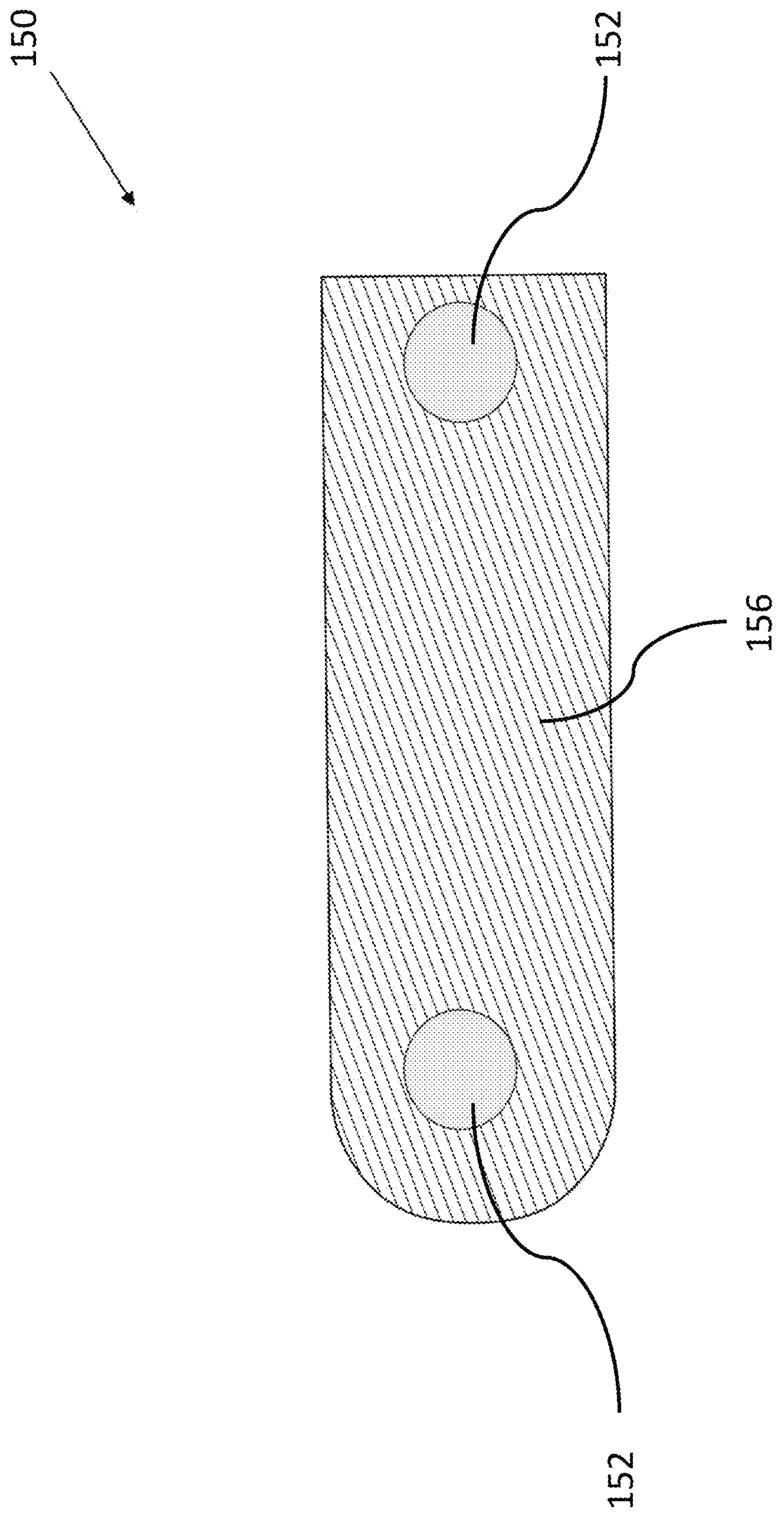
FIG. 6 is a bottom view of the base, according to some embodiments of the present invention.
Figure 7:
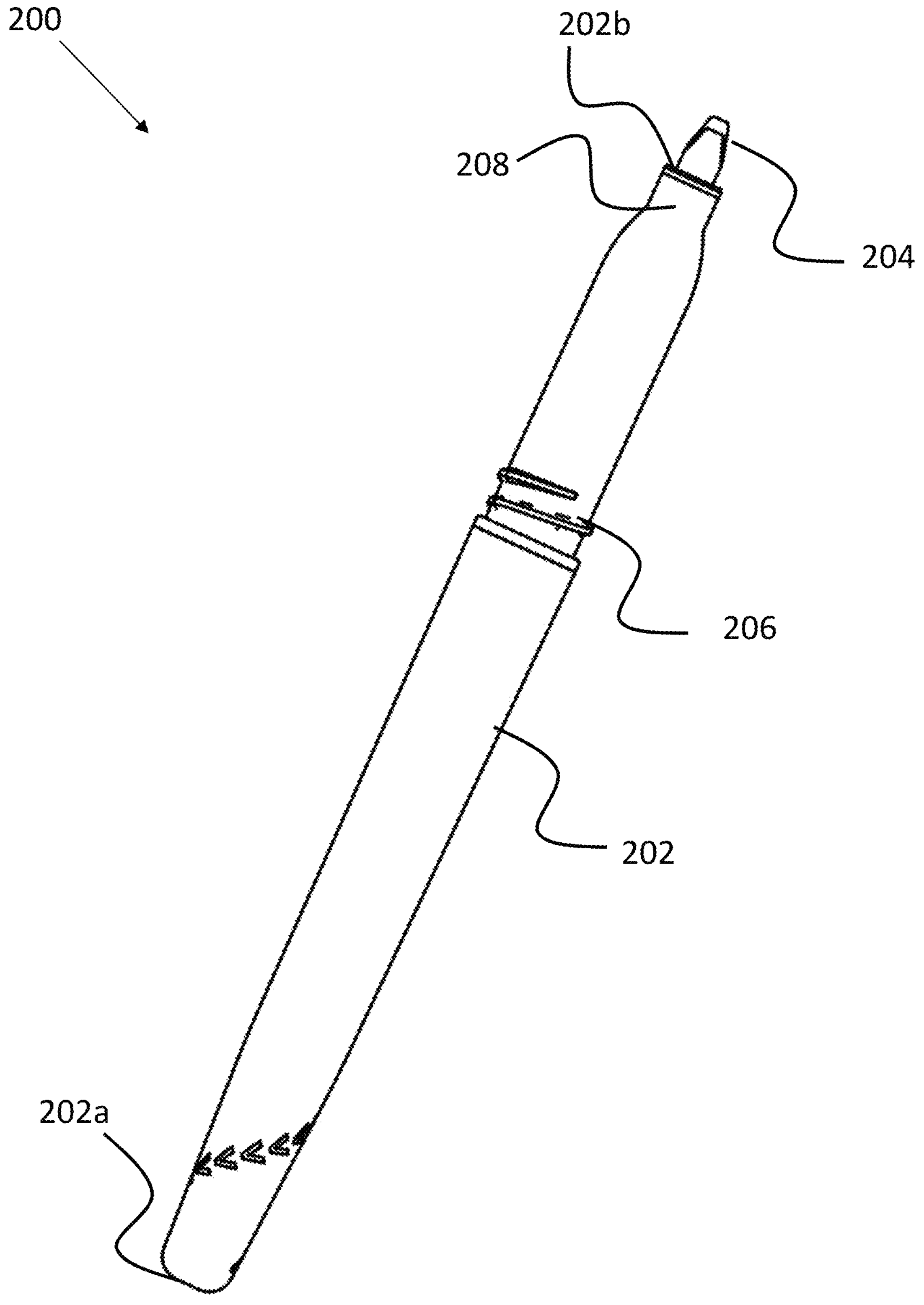
FIG. 7 illustrates a highlighter pen, according to some embodiments of the present invention.

FIG. 5 is a perspective view of the base 150 of the holding device of FIG. 1, according to some embodiments of the present invention. FIG. 6 is a bottom view of the base 150.

Figure 8:
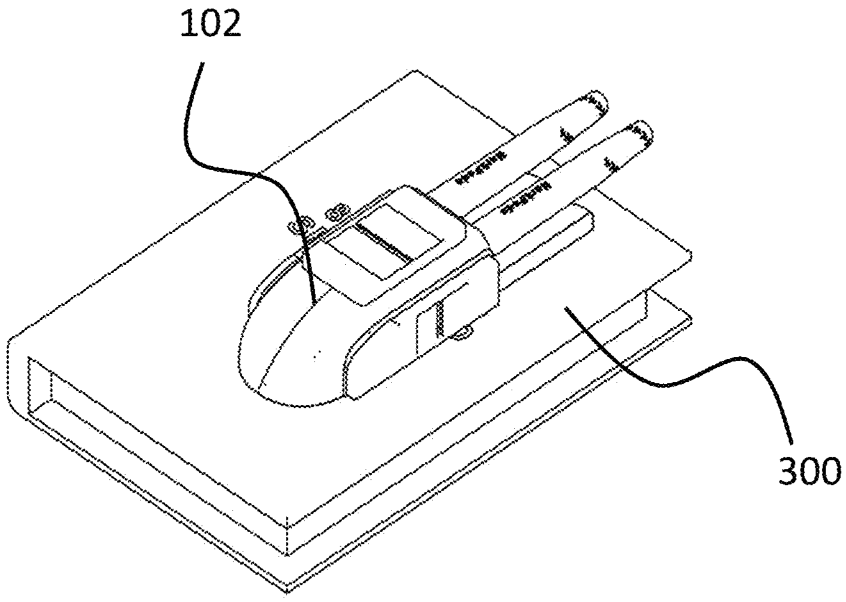
FIGS. 8-9 illustrate a holding device of the present invention clasping the cover of a book.
Figure 9:
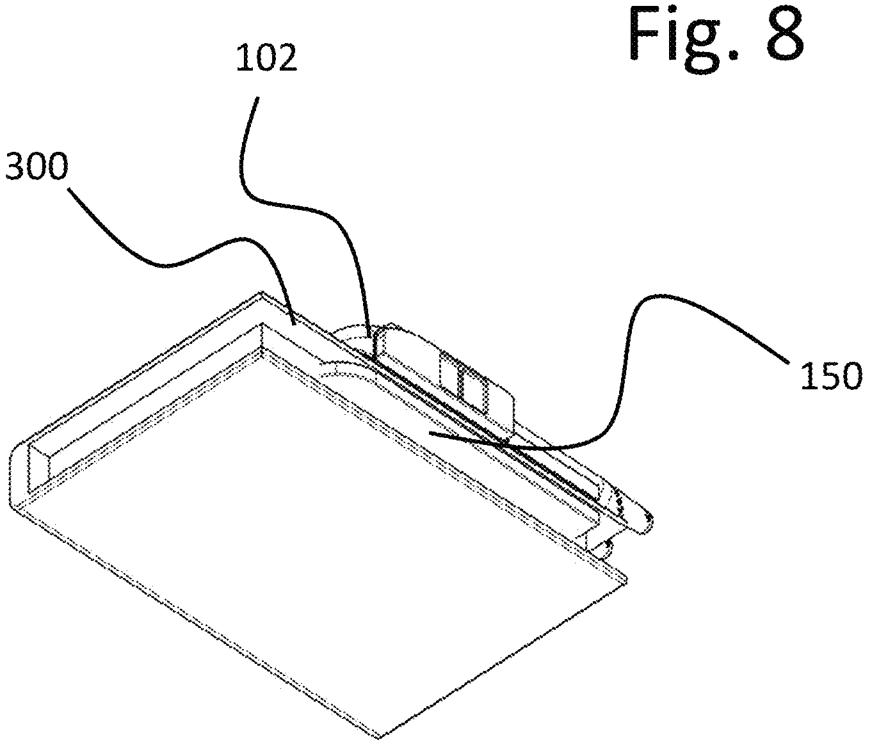

The base 150 includes one or more magnets 152. The attraction between the magnet(s) 112 of the holding case 102 (in FIG. 4) and the magnet(s) 152 of the base 150 makes the base 150 removably joinable to the holding case 102. The magnets 112 and 152 are selected such that the attraction therebetween enables the joining of the base 150 and of the holding case 102 even when via a cover 300 of a book or a notebook is interposed between the base 150 and the holding case 102, as shown in FIGS. 8-9. In this manner, the holding case 102 is placed on the outer surface of the cover 300 while the base 150 is placed in the inner surface of the cover 300, to securely join the holding device to the cover 300 and enable a user to comfortably carry highlighter pens with the book or notebook. In some embodiments of the present invention, the magnets are chosen such that the base 150 and the holding case 102 securely join to the book or notebook even when, in addition to the cover 300, a few pages (e.g., 1-15) of the book and notebook are interposed between the base 150 and the holding case 102.

In some embodiments of the present invention, the base 150 is in the form of a flat panel, so that the base 150 can be easily placed inside a book or notebook without significantly increasing the size of the book or notebook.

In some embodiments of the present invention, two magnets 152 are present and are located at opposing end sections of the base 150. The magnets 152 of the base 150 may be aligned with the magnets 112 of the holding case 102, to increase the attraction between the base 150 and the holing case 102 and to enhance the stability of the holding device 102 when the base 150 and the holding case 102 are joined together.

In some embodiments of the present invention, at least one surface of the base 150 (which may contact the cover, or may contact a page of the book) has a friction enhancing sheet 156, similar to the friction enhancing sheet 114 of the holding case, as discussed above. The friction enhancing sheet 156 increases friction between the book/notebook and the base 150 and decreases the risk of the base 150 slipping away from the book/notebook.

In some embodiments of the present invention, the corners of the base 150 are round, to prevent damage to the user or to objects. In some embodiments of the present invention, the edges of the base 150 are filleted, to decrease the risk of harm to a user then the holding case is clasped to the base 150 by the attraction of the magnet(s) 152 to the magnet(s) 112 of the base. The base 150 may be anti-swallow to prevent swallowing of the base by a person and to ensure adherence to various international safety standards.

FIG. 8 illustrates a highlighter pen 200, according to some embodiments of the present invention.

The highlighter pen 200 includes a shaft 202 extending between a proximal end 202*a* and a distal end 202*b* and containing ink. A tip 204 (such as a felt tip) extends from distal end 202*b* and is configured to absorb the ink from the shaft and to lay the ink on a page of a book, notebook, newspaper, or any other surface via contact with the surface.

In some embodiment of the present invention, the highlighter pen 200 includes a thread 206 extending from the shaft 202 and configured to cooperate with the thread of the holding case, as mentioned above. In some embodiments of the present invention, a magnet (not shown) is incorporated into the shaft 202, to be attracted to the gripping unit of the holding case when aligned therewith, if the gripping unit includes a magnet, as explained above.

In some embodiments of the present invention, a distal end section 208 of the shaft 202 located just proximally of the tip 202 is narrower than the rest of the shaft 202, to fit inside the chamber of the holding case, in the embodiments in which the chamber of the holding case is narrower than the channel of the holding case, as explained above.

Figure 10:
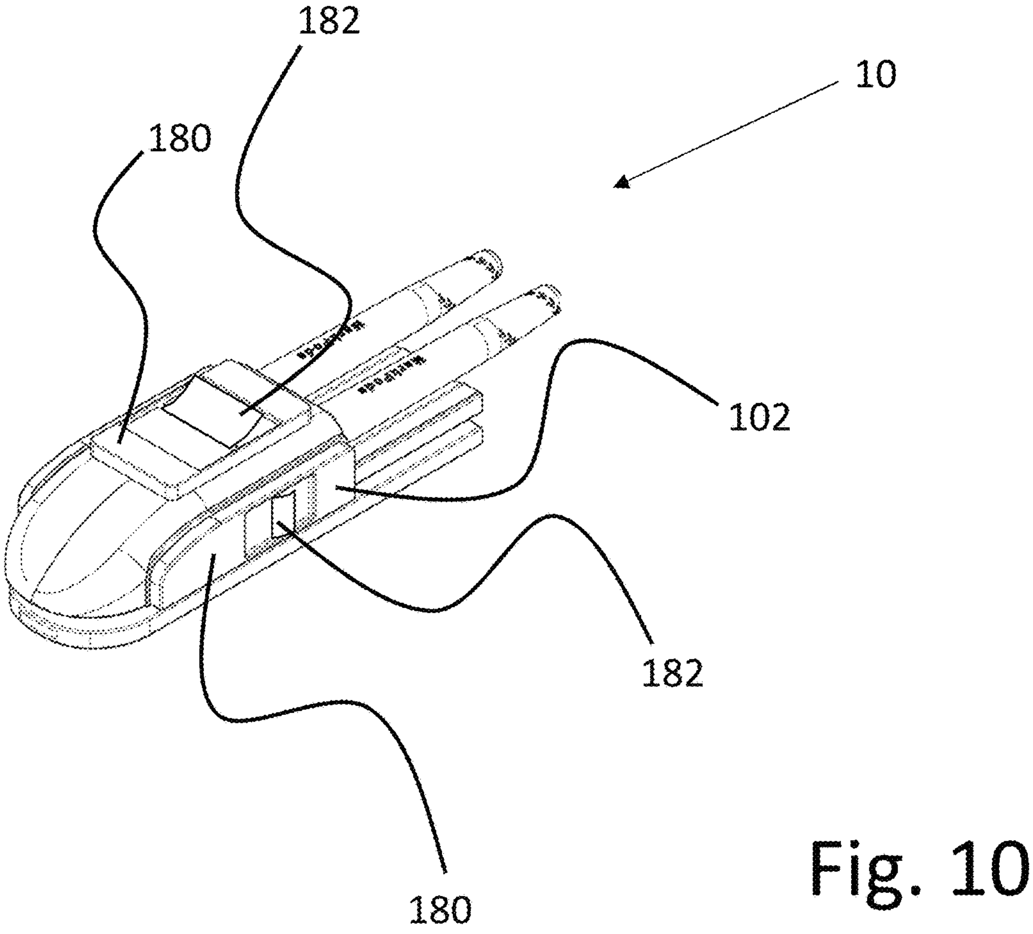
FIGS. 10-11 illustrate a holding device which includes one or more sticky-note containers, according to some embodiments of the present invention.
Figure 11:
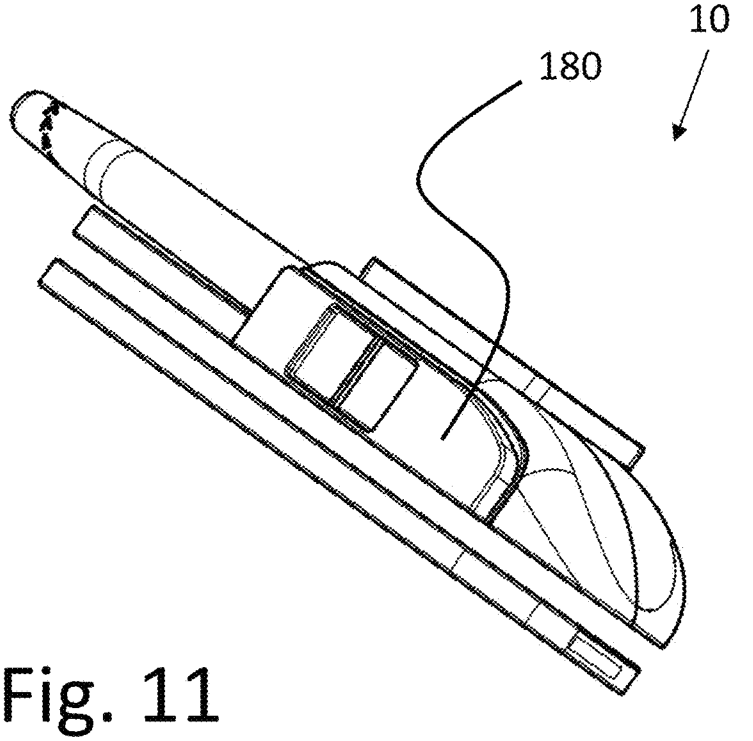

FIGS. 10-11 illustrate a holding device which includes one or more sticky-flag containers, according to some embodiments of the present invention.

In some embodiments of the present invention, the holding case 102 of the holding device 100 includes one or more sticky flag containers 180 located on the holding case 102. In this manner, the user may comfortably attach sticky flags 182 to the book or notebook as permanent bookmarks. In some embodiments of the present invention, the sticky note containers 180 are removably joined to the holding case 102. In this manner, the user may replenish containers 180 which have run out of sticky notes 182. The sticky note container(s) 180 may be removably joined to the holding case by using any known mechanism. Non-limiting examples of such mechanisms include a slide-and-latch mechanism or a clicking mechanism, both of which are known in the art.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

What is claimed is:

1. A holding device for a highlighter pen, comprising:

(i) a holding case comprising:

at least one channel to receive the highlighter pen, the at least one channel having a first opening at a first end of the channel and a second opening at a second end of the channel, the first opening being configured for insertion of the highlighter pen into the channel;

a gripping unit in the channel, configured to removably grip the highlighter pen inside the channel, wherein the gripping unit comprises first threads configured to cooperate with second threads on the highlighter pen;

at least one chamber, each chamber extending from the second end of a respective one of the at least one channel and configured to receive a tip of the highlighter pen, the chamber comprising a sealing unit configured to cooperate with the highlighter pen when the highlighter pen has traversed the sealing unit, to seal an airtight environment in which the tip of the highlighter pen is contained from an external environment;

at least one first magnet;

(ii) a base having at least one second magnet, such that attraction between the at least one first magnet and the at least one second magnet makes the base removably joinable to the holding case.

2. The holding device of claim 1, wherein the sealing unit is positioned to cooperate with the highlighter pen when the highlighter pen is fully threaded into the first threads.

3. The holding device of claim 1, wherein the gripping unit comprises a gasket configured to grip the highlighter pen by radially constricting the highlighter pen.

4. The holding device of claim 1, wherein the gripping unit comprises a third magnet configured to cooperate via attraction to a fourth magnet located on the highlighter pen when the fourth magnet on the highlighter pen is aligned with the third magnet of the gripping unit.

5. The holding device of claim 1, comprising at least one sticky note flag container joined to the holding case.

6. The holding device of claim 5, wherein the at least one sticky flag container is removably joined to the holding case.

7. The holding device of claim 1, wherein the at least one channel comprises a plurality of channels, and wherein the at least one chamber comprises a plurality of chambers, each of the plurality of chambers extending from a respective one of the plurality of channels.

8. The holding device of claim 1, wherein the at least one chamber is radially narrower than the at least one channel.

9. A kit comprising:

the holding device of claim 1; and at least one highlighter pen.

10. The kit of claim 9, wherein the sealing unit is positioned to cooperate with the highlighter pen when the highlighter pen is fully threaded into the first threads.

11. The kit of claim 9, wherein the gripping unit comprises a gasket configured to grip the highlighter pen by radially constricting the highlighter pen.

12. The kit of claim 9, wherein the gripping unit comprises a third magnet configured to cooperate via attraction to a fourth magnet located on the highlighter pen when the fourth magnet on the highlighter pen is aligned with the third magnet of the gripping unit.

13. The kit of claim 9, comprising at least on sticky flag container joined to the holding case.

14. The kit of claim 13, wherein the at least one sticky flag container is removably joined to the holding case.

15. The kit of claim 9, wherein the at least one channel comprises a plurality of channels, and wherein the at least one chamber comprises a plurality of chambers, each of the plurality of chambers extending from a respective one of the plurality of channels.

16. The kit of claim 9, wherein the at least one chamber is radially narrower than the at least one channel.

17. A holding device for a highlighter pen, comprising:

(i) a holding case comprising:

at least one channel to receive the highlighter pen, the at least one channel having a first opening at a first end of the channel and a second opening at a second end of the channel, the first opening being configured for insertion of the highlighter pen into the channel;

a gripping unit in the channel, configured to removably grip the highlighter pen inside the channel;

at least one chamber, each chamber extending from the second end of a respective one of the at least one channel and configured to receive a tip of the highlighter pen, the chamber comprising a sealing unit configured to cooperate with the highlighter pen when the highlighter pen has traversed the sealing unit, to seal an airtight environment in which the tip of the highlighter pen is contained from an external environment;

at least one first magnet;

(ii) a base having at least one second magnet, such that attraction between the at least one first magnet and the at least one second magnet makes the base removably joinable to the holding case;

(iii) at least one sticky flag container joined to the holding case.

18. The holding device of claim 17, wherein the at least one sticky flag container is removably joined to the holding case.

19. A kit comprising:

the holding device of claim 17; and at least one highlighter pen.

20. The holding device of claim 17, wherein the at least one sticky flag container is removably joined to the holding case.

* * * * *